United States Patent
Yekutiely et al.

(10) Patent No.: US 11,201,978 B2
(45) Date of Patent: Dec. 14, 2021

(54) SYSTEM AND METHOD FOR ARCHIVING DOCUMENTS

(71) Applicant: REEP TECHNOLOGIES LTD., Petah Tikva (IL)

(72) Inventors: Barak Yekutiely, Kochav Yair (IL); Margalit Yekutiely, Kochav Yair (IL)

(73) Assignee: VALIDOO LTD., Kochav Yair (IL)

( * ) Notice: Subject to any disclaimer, the term of this patent is extended or adjusted under 35 U.S.C. 154(b) by 0 days.

(21) Appl. No.: 16/708,460

(22) Filed: Dec. 10, 2019

(65) Prior Publication Data

US 2020/0236240 A1    Jul. 23, 2020

Related U.S. Application Data

(63) Continuation-in-part of application No. 16/249,939, filed on Jan. 17, 2019, now Pat. No. 10,547,757.

(51) Int. Cl.
*H04N 1/00* (2006.01)

(52) U.S. Cl.
CPC ..... *H04N 1/00819* (2013.01); *H04N 1/00018* (2013.01); *H04N 1/00724* (2013.01)

(58) Field of Classification Search
None
See application file for complete search history.

(56) References Cited

U.S. PATENT DOCUMENTS

| | | | | |
|---|---|---|---|---|
| 5,418,373 A * | 5/1995 | Shimura | ............... | H04N 5/3205 250/583 |
| 5,424,881 A * | 6/1995 | Behrens | ................. | G11B 5/012 360/40 |
| 6,158,344 A * | 12/2000 | Walker | ............... | H04N 1/00002 101/483 |
| 6,318,265 B1 * | 11/2001 | Sobel | ..................... | B41M 3/005 101/483 |
| 6,456,272 B1 * | 9/2002 | Howard | .................. | G09F 9/372 345/107 |
| 6,704,431 B1 * | 3/2004 | Ogawa | .................. | G06T 1/0028 375/E7.089 |
| 7,130,067 B1 * | 10/2006 | Shibasaki | .......... | H04N 1/00132 358/1.15 |
| 10,341,530 B1 * | 7/2019 | Sabandith | ............. | G06F 3/1242 |
| 2004/0070676 A1 * | 4/2004 | Lawther | ............. | H04N 1/00249 348/222.1 |
| 2006/0198649 A1 * | 9/2006 | Imamiya | ............... | G03G 9/0928 399/53 |

(Continued)

FOREIGN PATENT DOCUMENTS

WO    2015173575 A1    11/2015

*Primary Examiner* — Anh-Vinh Thi Nguyen
(74) *Attorney, Agent, or Firm* — Soroker Agmon Nordman (57) ABSTRACT

A device for digitizing papers, including a controller having a processor and memory, a digitizing scanner configured to accept a paper, digitize content of the paper and transfer the digitized content to the controller, a program executed by the controller that is configured to identify calibration markings or unique fingerprints from specific locations of the paper, embedded in the digitized content, wherein the program provides a determination that the digitizing scanner is functioning correctly if the calibration markings or unique fingerprint are identified as being correct or by identifying a type of paper digitized from characteristics of the unique fingerprint.

17 Claims, 3 Drawing Sheets

(56) References Cited

U.S. PATENT DOCUMENTS

| | | | |
|---|---|---|---|
| 2006/0269328 A1* | 11/2006 | Ochiai | G03G 15/0126 399/223 |
| 2008/0130037 A1* | 6/2008 | Tamayo | G06K 15/02 358/1.15 |
| 2009/0304430 A1* | 12/2009 | Vetromile | G03G 15/655 400/605 |
| 2010/0261458 A1* | 10/2010 | Del Gallo | G06F 3/03545 455/414.1 |
| 2011/0157267 A1 | 6/2011 | Kazmaier et al. | |
| 2012/0306958 A1* | 12/2012 | Pawlik | B41J 11/009 347/19 |
| 2013/0058666 A1* | 3/2013 | Takahashi | G03G 21/00 399/38 |
| 2013/0209665 A1* | 8/2013 | Ayyappanpillai | C09D 11/17 427/7 |
| 2013/0293931 A1* | 11/2013 | Yasunaga | H04N 1/00037 358/3.28 |
| 2013/0308146 A1 | 11/2013 | Pouyadou et al. | |
| 2014/0078565 A1* | 3/2014 | Fujiwara | G03G 15/5062 358/505 |
| 2015/0029286 A1* | 1/2015 | Yagi | B65H 43/04 347/179 |
| 2016/0168797 A1* | 6/2016 | Zhang | D21H 21/30 428/537.5 |
| 2016/0316092 A1* | 10/2016 | Eiyama | H04N 1/00734 |
| 2017/0344823 A1* | 11/2017 | Withrow | G06K 9/00577 |
| 2018/0176422 A1* | 6/2018 | Sato | H04N 1/6038 |
| 2020/0016907 A1* | 1/2020 | Ogushi | B41J 29/38 |
| 2020/0047513 A1* | 2/2020 | Arakane | B41J 2/2052 |

\* cited by examiner

SYSTEM AND METHOD FOR ARCHIVING DOCUMENTS

RELATED APPLICATIONS

This application claims priority as a continuation in part from application Ser. No. 16/249,939 dated Jan. 17, 2019 the disclosure of which is incorporated herein by reference.

TECHNICAL FIELD

The present disclosure relates generally to a system and method for archiving documents and more specifically wherein the system verifies that the documents are faithful to the source.

BACKGROUND

Regardless of the digitization of technology and the workplace, use of paper is still growing on an annual basis. Global production in the pulp, paper and publishing sector has continued to increase annually to this day. A large majority of pages printed both at home and in the workplace are disposed of, either as trash or by recycling, the average lifespan of a print being less than 1 day. Thus, the amount of waste is enormous, more than 700 pounds of paper are consumed by the average American every year. Although paper is not considered an expensive commodity, the economic impact of the sheer volume is tremendous; this is estimated at about 10000 pages per year per office employee. Not to mention the impact on forests worldwide and the impact on the atmosphere.

Many companies aim to reduce their dependence on paper, for example by working mainly in a paperless environment. This typically requires digitizing archives and converting new documents arriving at the company into digital form. Such processes are costly and run the risk of loss of information due to scanning errors, for example by digitizing documents and destroying them only to later discover that the digitization process was unsuccessful.

U.S. Pat. No. 9,216,592 dated Dec. 22, 2015 the disclosure of which is incorporated herein by reference, discloses a system and method for reprinting on paper using an automated digitizing and erasing system to backup, erase and reuse enhanced paper.

The ease of forming copies of documents tends to lead to a common problem of having multiple copies of documents. Digitizing the paper documents may reduce the clutter but still leaves the problem of having a database of data with a lot of duplication. Thus it is desirable to have a system that can also help in de-duplicating paper documents, for example providing a single digitized copy from multiple copies of a specific paper document.

SUMMARY

An aspect of an embodiment of the disclosure relates to a device and method for digitizing content of papers in which the digitized content is authenticated as being successfully digitized and the papers are output from the device to different output trays responsive to the success or failure of the authentication. The authentication is based on scanning the document twice with two separate digitizing scanners and comparing the results from the two digitizing scanners to make sure that the digitized content matches the content of the paper. Alternatively or additionally, the device includes calibration markings that are digitized with the document by the first digitizing scanner and the calibration markings are authenticated to verify that the digitizing scanner is digitizing correctly. Further alternatively, the device is programmed to identify calibration markings from the digitized papers or to identify a unique fingerprint from the digitized paper and/or to identify the type of paper that was digitized from characteristics of the unique fingerprint. The digitizing process of the paper is authenticated based on the identified calibration markings, unique fingerprints and/or identification of the type of paper.

In an exemplary embodiment of the disclosure, the device may be preset to deal with standard disposable paper or enhanced reusable paper. Alternatively, the device may identify the type of paper based on the digitized content of the paper. Optionally, the device may select the output tray based on the success or failure of the authentication and the type of paper.

In an exemplary embodiment of the disclosure, the device includes an ablation scanner to erase the content of the paper. Optionally, the ablation scanner is activated if the authentication is successful. Optionally, the ablation scanner is activated only for enhanced reusable paper. Alternatively, the ablation process may be activated regardless of the type of paper.

In an exemplary embodiment of the disclosure, the device may use an additional digitizing scanner to evaluate the paper after being erased by the ablation scanner. Optionally, the output tray for outputting the paper is selected additionally responsive to evaluation of the paper after being erased.

In some embodiments of the disclosure, the device is configured to handle dual sided papers and digitizing content from both sides of the paper simultaneously or sequentially without turning over the paper.

In an exemplary embodiment of the disclosure, after digitizing a document the device may compare the digitized document with previously digitized document to remove duplications or only store changes relative to other documents that are similar.

There is thus provided according to an exemplary embodiment of the disclosure, a device for digitizing papers, comprising:

A controller having a processor and memory;

An input tray for providing papers;

A first digitizing scanner configured to accept a paper from the input tray, digitize content of the paper and transfer the digitized content to the controller;

Calibration markings that are digitized with each paper digitized by the first digitizing scanner or a second digitizing scanner configured to accept the paper from the first digitizing scanner, digitize content of the paper and transfer the digitized content to the controller;

A program executed by the controller that provides a determination that the calibration markings were scanned correctly with each paper digitized by the first digitizing scanner or compares the digitized content of the paper from the first digitizing scanner with the digitized content of the paper from the second digitizing scanner and provides a determination if the content of the paper from the first digitizing scanner matches the content of the paper from the second digitizing scanner;

Two or more output trays; and

Wherein the controller directs the paper to one of the output trays based on the determination.

In an exemplary embodiment of the disclosure, the controller identifies if the paper is standard disposable or enhanced reusable based on the digitized content from the first digitizing scanner, the second digitizing scanner or predefined parameters. Optionally, the device includes an ablation scanner configured to erase the content of the paper; and wherein the ablation scanner is activated by the controller based on the determination and based on identifying if the paper is enhanced reusable. In an exemplary embodiment of the disclosure, the device includes a third digitizing scanner configured to evaluate the paper after being erased by the ablation scanner; and wherein the controller directs the paper to one of the output trays based on the evaluation in addition to the determination. Optionally, the device is configured to direct papers to a successful output tray if the determination is positive and the erasing was evaluated as successful.

In an exemplary embodiment of the disclosure, the device is configured to direct papers to a failed output tray if the determination is negative or the erasing was evaluated as unsuccessful. Optionally, the device is configured to direct papers to a shredder output tray if the determination is positive and the paper is identified as standard disposable paper. In an exemplary embodiment of the disclosure, the device is configured to direct papers to a duplex output tray if the papers need to be processed on another side. Optionally, the first digitizing scanner and second digitizing scanner include a pair of scanners configured to digitize both sides of the paper simultaneously or sequentially without turning over the paper. In an exemplary embodiment of the disclosure, the ablation scanner includes a pair of ablation scanners configured to erase both sides of the paper simultaneously or sequentially without turning over the paper.

There is further provided according to an exemplary embodiment of the disclosure, a method of digitizing, comprising:

Accepting papers in an input tray for digitizing;

Digitizing content of the paper with a first digitizing scanner;

Digitizing calibration markings with each paper digitized by the first digitizing scanner or digitizing content of the paper with a second digitizing scanner;

Comparing the calibration markings to predefined markings or comparing the digitized content of the paper from the first digitizing scanner with the digitized content of the paper from the second digitizing scanner;

Determining if the content of the paper from the first digitizing scanner was scanned correctly based on the comparing;

Directing the paper to one of two or more output trays by a controller responsive to the determining.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
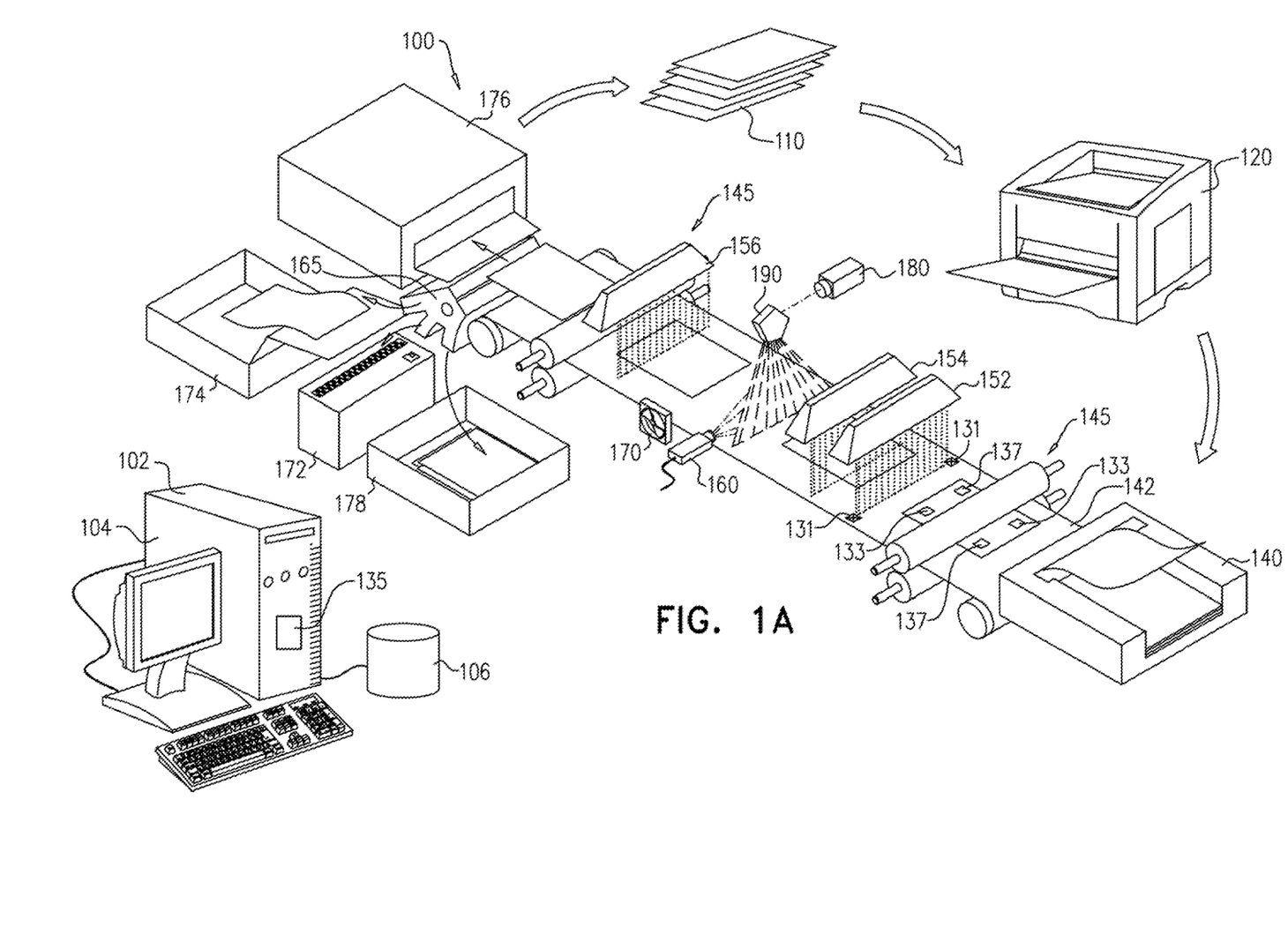
FIG. 1A is a schematic illustration of a device for processing a single side of a paper document, according to an exemplary embodiment of the disclosure.

FIG. 1A is a schematic illustration of a device 100 for processing a single side of a paper document. In an exemplary embodiment of the disclosure, system 100 includes an input tray 140 for placing used paper 110 embedded with images, e.g. text or pictures. The images may be embedded using a standard ink or laser printer 120 or other devices. Optionally, the paper 110 may be standard printing paper that is typically used in standard ink or laser printers, or enhanced paper that is ablation resistant and can be erased by an ablation process and reused, for example paper made from ceramic fibers or coated by an ablation resistant coating. The size of the paper handled by device 100 may be a standard paper size (e.g. A4, Letter or Legal) or may be user adjustable (e.g. a custom size).

In an exemplary embodiment of the disclosure, sheets of paper 110 from the input tray 140 are provided into device 100 for processing. Optionally the device may use a conveyor 142 or other elements to transfer the paper through various processing stations. The device 100 may also use rollers 145 or other elements to transfer the paper 110 from station to station.

In an exemplary embodiment of the disclosure, a first station includes a digitizing scanner 152 that scans the face up side of a paper and converts it to digitized data. The digitized data is provided to a controller 102 and stored in a storage 106 (e.g. a hard disk or other hardware for storing data). Controller 102 may be an internal computer, an external computer or a processor and memory embedded in device 100 and may also serve as the controller 102 to instruct each station how to handle each paper 110 passing through device 100.

In an exemplary embodiment of the disclosure, the first scanning station may include calibration marks 131 beyond the width of the paper 110. The calibration marks are digitized with the paper 110 to verify that the digitizing scanner 152 is functioning correctly (e.g. by comparing the calibration marks to predefined markings). Optionally, if the calibration marks do not appear correctly in the digitized data, device 100 may determine that the digitizing process has failed.

Alternatively or additionally, device 100 may include a second station the paper is scanned again with a digitizing scanner 154 and provided to controller 102. In an exemplary embodiment of the disclosure, controller 102 executes a program 135 that compares the results of the first scan with the results of the second scan to authenticate that the content of the paper 110 was digitized correctly (e.g. when the two essentially match). Optionally, if there are significant discrepancies between the first scan and the second scan the paper 110 will be rejected. For example the digitizing process may be halted and all the papers 110 being processed may be ejected or only specific papers 110 that failed authentication will be ejected without further processing while continuing to process other papers 110. Authenticating the digitization scanning process reduces to a minimum the risk of erasing a paper that was not digitized correctly (for example due to dirt, folding of the paper or failure of the first digitizing scanner 152 or the second digitized scanner 154). If multiple consecutive papers fail to authenticate, device 100 will alert a user of the device that there is a problem with the digitizing scanners 152, 154 or with the papers 110 being scanned, for example if the papers 110 are of a wrong size and cannot be handled by device 100.

In an exemplary embodiment of the disclosure, the papers 110 are preprocessed to include preselected calibration markings 133 (visible or non-visible to the naked eye). Optionally, only one digitizing scanner 152 is then required. The device 100 uses the first digitizing scanner 152 to scan the paper 110 and authenticate that the digitizing scanner 152 is functioning properly by identifying the calibration markings 133 on the paper 110 and determining that they are correct based on pre-stored calibration markings.

Alternatively or additionally, specific locations on the papers 110 may be pre-sampled to identify one or more unique fingerprint 137 for each paper 110 at specific locations on the paper, for example by scanning a pack of papers 110 before using it. Optionally, the unique fingerprints 137 may be stored in a database at storage 106. When scanning pre-sampled papers the results are analyzed by controller 102 to extract the fingerprints 137 from the same preselected locations. Correct functioning of the digitizing scanner 152 is then determined by identifying that the fingerprints of a current paper 110 match the fingerprints of the paper 110 previously recorded in the database at storage 106.

In an exemplary embodiment of the disclosure, specific locations of the papers 110 are analyzed to identify unique fingerprints 137 of the paper 110 without having pre-sampled the papers 110. Optionally, characteristics of the fingerprints 137 provide an indication of the type of paper used, for example if it is standard paper or enhanced paper in contrast to no paper being scanned or a malfunction of the digitizing scanner 152. In an exemplary embodiment of the disclosure, the characteristics include: the type of pattern made by the paper in an enlarged microscopic picture, the thickness and geometry of the fibers, imperfections, interaction between the fibers, coated surface texture and variabilities such as opacity and brightness mottling. Optionally, these characteristics are unique for every position on the paper and for every paper or media used. These characteristics can be used to identify the existence of a paper and the type of paper being used.

In an exemplary embodiment of the disclosure, controller 102 determines if a paper 110 was scanned, what type of paper 110 it is and a unique fingerprint 137 from the paper. Thus if the paper 110 is erased and reused it can in future processing be identified as having been previously handled by device 100. In an exemplary embodiment of the disclosure, device 100 can count the number of times a specific paper 110 is erased based on the recorded unique fingerprints. Likewise controller 102 identifies that digitizing scanner 152 is functioning properly based on the ability of the digitizing scanner 152 to identify that a paper was scanned and a unique fingerprint was identified. Optionally, digitizing scanner 152 may also determine the size of the paper 110 (e.g. A4, Letter, custom) based on the existence of a unique fingerprint 137 along the length of the paper 110.

In an exemplary embodiment of the disclosure, if the authentication is successful the paper 110 may be erased at a third station with an ablation scanner 190 that uses a light source 180 with optical elements (e.g. mirrors and/or lenses) to ablate the images 110 on paper 110. Optionally, device 100 may include a counter 160 that counts the papers 110 or controller 102 may count the pages based on the digitizing results or based on the erasing results. In an exemplary embodiment of the disclosure, device 100 includes a fan 170 to disperse debris from the ink or toner released in the ablation process. Optionally, after erasing the paper 110 a third digitizing scanner 156 at a fourth station scans the paper 110 to verify that the paper 110 is completely erased and/or evaluate the status of the paper 110.

Optionally, device 100 may be adapted to handle also dual sided paper documents by processing them twice once face up and once face down and taking into consideration if they are in the first round or in the second round.

In an exemplary embodiment of the disclosure, a selector 165 directs the paper 110 to one of a few possible paths. One path includes a shredder output tray 172 that may include or be fed automatically into a shredder, a second path includes a failed output tray 174 for rejected papers 110, a third path includes a successful output tray 176 for papers that are ready for reuse and a fourth path includes a duplex output tray 178 for collecting papers for flipping and processing on the other side. Optionally, controller 102 keeps track of each paper and decides where it should go. In some embodiments of the disclosure, the output trays may be sealed vaults to prevent tampering with the papers while they are accumulating. For example to protect the papers in the shredder output tray before they are shredded or in the duplex output tray before they are re-processed.

In an exemplary embodiment of the disclosure, papers that were successfully digitized and successfully erased may be sent to the successful output tray 176 for reuse. Papers that were successfully digitized but unsuccessfully erased may be sent to the shredder output tray 172 or to the failed output tray 174. Papers that were unsuccessfully digitized will not be erased and may be ejected to the failed output tray 174 for reprocessing or evaluation, e.g. to determine why the digitization process failed. Optionally, erased papers may be analyzed to determine a deinking level (e.g. according to the Ingede de-inkability standard) and directed to output trays based on the deinking level.

In an exemplary embodiment of the disclosure, controller 102 may differentiate between papers that are being processed on their first side and papers that are being processed on their second side. For example when processing the first side the papers may all be digitized, optionally erased and sent to the duplex output tray 178 for processing on their second side. Whereas papers that are being processed on the second side may be erased and sent to the successful output tray 176 for reuse or sent to the shredder output tray 172 to be destroyed or collected for recycling. Optionally, standard paper may be collected for recycling and enhanced paper may be reused. In some embodiments of the disclosure, standard paper may be digitized without erasing the paper and shredded after processing the second side. In contrast enhanced paper may be erased after digitizing and then placed in the successful output tray 176 for reuse after successfully being digitized and erased on both sides.

In some embodiments of the disclosure, the results of the digitizing scanners (from digitizing scanners 152, 154 and/or 156) and/or ablation scanning (from ablation scanner 190) are processed by controller 102 and provided as an indication to the user on a display. The user may then manually process the paper 110 based on the indication, instead of using selector 165. For example the user may place the paper in the correct output tray e.g. shredder output tray 172 or successful output tray 176.

In an exemplary embodiment of the disclosure, digitizing scanner 152, digitizing scanner 154 and digitizing scanner 156 may be set with different lighting parameters or resolution settings to verify that all the required information is captured. Likewise the digitizing scanners 152, 154 may be able to identify from the digitized data if the paper is enhanced paper or standard paper. For example by identifying a special marking on enhanced paper, by evaluating the results of the paper 110 after being erased with the ablation scanner 156 (e.g. standard paper may be scarred or discolored) or by identifying unique fingerprints 137 as described above. Additionally, the user may notify controller 102, which type of paper (enhanced or standard) is being processed so that controller 102 can route the papers 110 correctly to output trays and apply the correct processing.

In an exemplary embodiment of the disclosure, program 135 may include a database for docketing, storing and retrieving documents to enable the user to search and recall documents by file, date or other parameters from storage 106. Optionally, the documents are stored with meta-data, which may include the identity of the user operating the device 100, the processing time and date, a unique ID for each document processed, a machine serial number to identify the device 100, which processed the documents. In some embodiments of the disclosure, the data in the database is encrypted so that only authorized users may access the data. Optionally, the digitized documents may be digitally signed and/or formatted as PDF/A or other standards.

In an exemplary embodiment of the disclosure, paper 110 may include a unique ID that is embedded (e.g. a watermark) in the paper 110 or based on the physical properties of the paper 110 (e.g. fingerprint 137). Optionally, the digitization process may record the unique ID of the paper 110 in the meta-data of the digitized paper. In some embodiments of the disclosure, when comparing the data from digitizing scanner 152 with the data from digitizing scanner 154 the unique ID is also compared to verify that the same document was digitized. The unique ID may be in the form of a Barcode, QR code or other special preselected code or symbol.

In an exemplary embodiment of the disclosure, controller 102 may instruct the processor to search in the database at storage 106 for the same or similar versions of the digitized paper 110 to prevent storing duplicate copies of paper documents. Optionally, the database at storage 106 may be programmed to store similar documents by providing a pointer to a first copy and store data reflecting the differences from the first copy instead of keeping multiple copies of the same or similar documents. In some embodiments of the disclosure, device 100 is programmed to provide access to groups of paper documents based on similarity of content, for example showing a user multiple documents that are slight variations of each other. In some embodiments of the disclosure, device 100 can present a user with a group of document having a similar symbol, for example all documents with a specific signature or a specific logo or header. In some embodiments of the disclosure, multiple devices 100 may be linked together over a network and enable a user to compare documents locally or over the network. In some embodiments of the disclosure, the documents may be processed by an optical character recognition (OCR) program to compare the content.

In an exemplary embodiment of the disclosure, program 135 may control processing of each paper 110 processed by device 100, for example for each paper turning on and off the digitizing scanners (152, 154, 156), ablation scanner 180 and controlling selector 165 to control where each paper 110 is sent. Optionally, ablation scanner 180 may be instructed what to erase and what not to erase based on the digitized data received from the digitizing scanners (152, 154), for example to erase specific colors, not to erase watermarks and/or to try to erase or not to try to erase stains and dirt marks.

Optionally, controller 102 may include input elements such as a mouse and keyboard and output elements such as a screen 104 or a speaker so that the controller 102 may provide information to the user and allow the user to search for documents in the database or see the results of a digitizing process.

In an exemplary embodiment of the disclosure, program 135 may be provided on a non-transitory computer readable medium and installed in controller 102. The medium may include a CD, DVD, USB drive and other types of portable medium for transferring data.

Figure 1B:
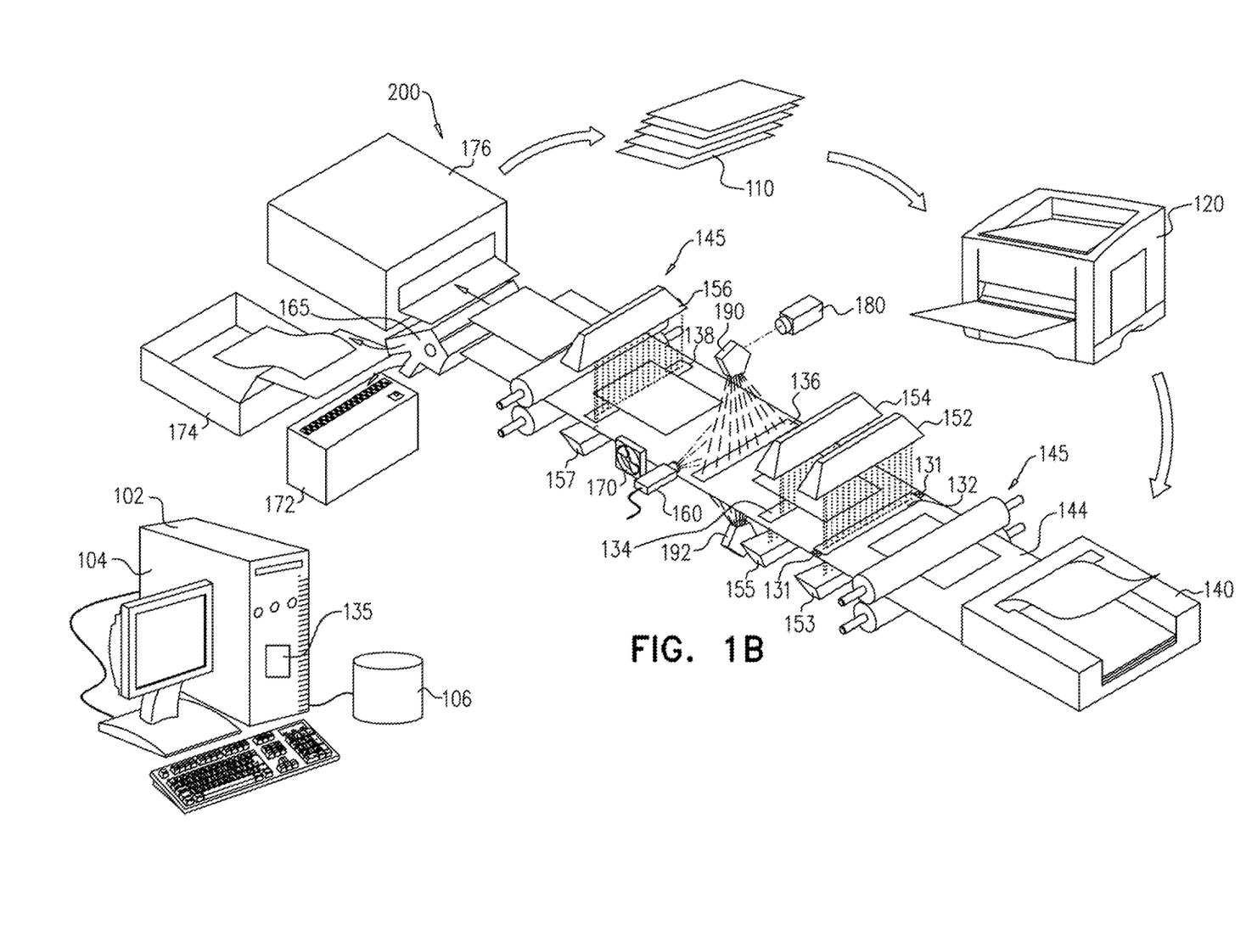
FIG. 1B is a schematic illustration of a device for simultaneously processing dual sided paper documents, according to an exemplary embodiment of the disclosure.

FIG. 1B is a schematic illustration of a device 200 for simultaneously processing dual sided paper documents. In an exemplary embodiment of the disclosure, device 200 may include similar elements as device 100 and adapted to simultaneously or sequentially process both sides of a document without flipping the paper.

In an exemplary embodiment of the disclosure, device 200 includes a surface 144 and rollers 145 and/or other elements for transferring papers from one processing station to another. Optionally, a first station includes a pair of digitizing scanners 152, 153 on opposite sides of surface 144 and an opening 132 on surface 144 to enable digitizing both sides of the paper 110 simultaneously or sequentially, for example by having an offset between the position of digitizing scanner 152 for digitizing the upper side of paper 110 and opening 132, which enables digitizing the underside of the paper with digitizing scanner 153.

In an exemplary embodiment of the disclosure, a second station includes a pair of digitizing scanners 154, 155 on opposite sides of surface 144 and an opening 134 on surface 144 to enable digitizing both sides of the paper 110 as in the first station. By comparing the results of the digitizing scan from the first station and the second station device 200 can authenticate that the paper 110 was correctly digitized on both sides.

In an exemplary embodiment of the disclosure, a third station includes two ablation scanners 190 and 192 on opposite sides of surface 144 and an opening 136 on surface 144 to erase the paper 110 as it flows by and is authenticated by the first and second stations. Optionally, the paper may be erased on one side or both sides simultaneously or sequentially based on instructions from program 135 in controller 102.

In an exemplary embodiment of the disclosure, after erasing the paper 110 a fourth station including a third pair of digitizing scanners 156 and 157 and an opening 138 digitizes the paper 110 to evaluate the status of the paper after being erased. Optionally, based on the digitizing at the fourth station, program 135 can decide where to send each sheet of paper. For example based on if the paper is clean, damaged or fails to be erased satisfactorily.

In an exemplary embodiment of the disclosure, selector 165 is controlled by controller 102 and program 135 to select one of three output options for device 200:

1. Shredder output tray 172—for sending directly to a shredder to physically destroy paper 110;
2. Failed output tray 174—for collecting papers that failed to authenticate; and
3. Successful output tray 176—for collecting papers that were authenticated and erased successfully for reuse.

Alternatively, the results may be provided to the user by controller 102 as an indication on a display. Optionally, the user may place the paper in the correct output tray based on the indication.

Figure 2:
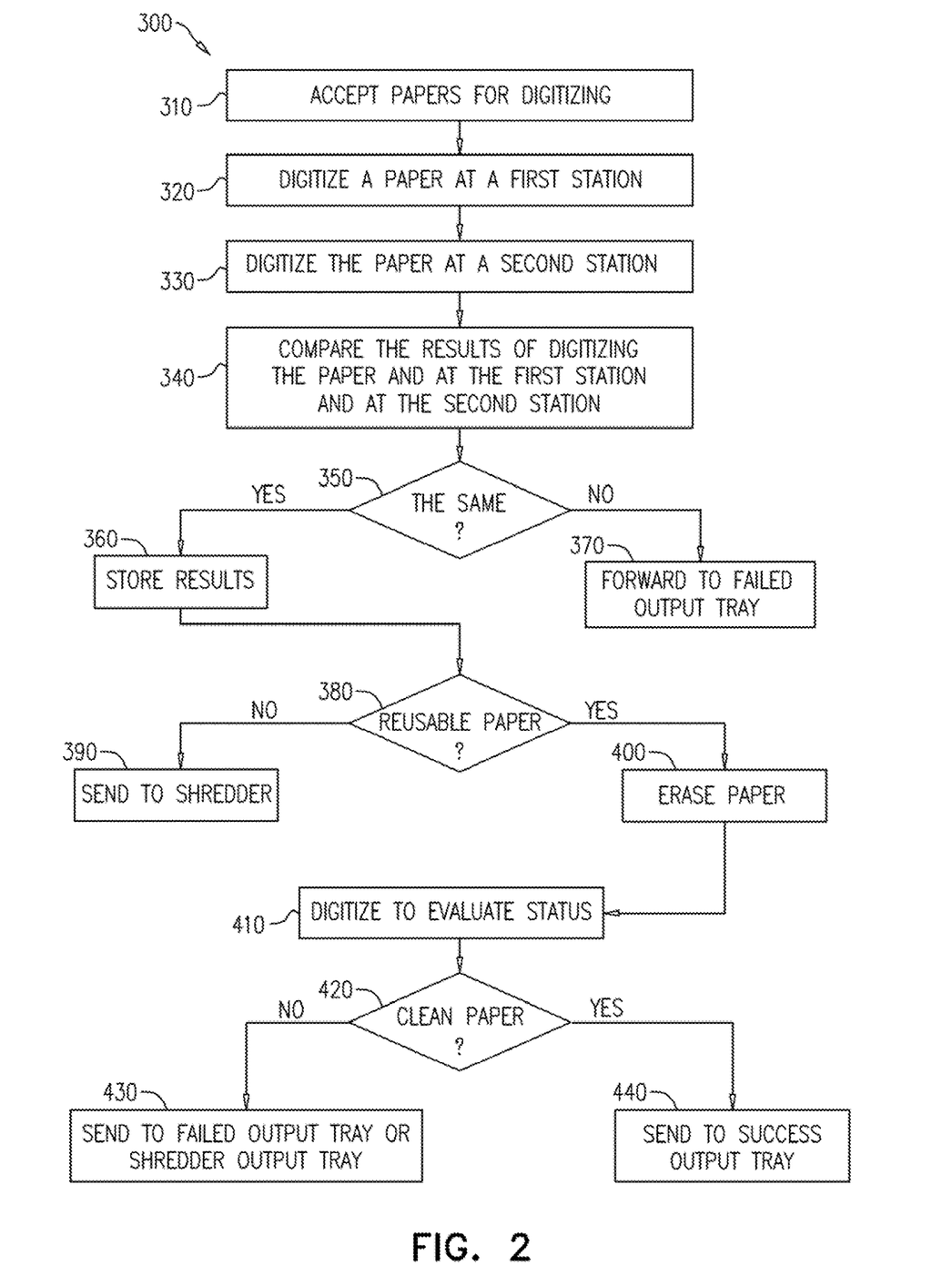
FIG. 2 is a flow diagram of a method of processing paper documents, according to an exemplary embodiment of the disclosure.

FIG. 2 is a flow diagram of a method 300 of processing paper documents. In an exemplary embodiment of the disclosure, input tray 140 of device 100 or device 200 accepts (310) one or more papers 110 for processing. Wherein processing may include digitizing the content of each paper 110 and storing it in a database, for example in storage device 106. Optionally, the device (100, 200) digitizes (320) a paper 110 at a first station. Device 100 digitizes a single side of the paper 110 using a single digitizing scanner 152 and device 200 digitizes both sides of the paper 110 using a pair of digitizing scanners (152, 153).

In some embodiments of the disclosure, the first digitizing scanner also scans calibration markings on a surface of the device to verify that the first digitizing scanner 152 is functioning correctly, for example by verifying that the calibration markings match predefined markings stored in the memory of controller 102. In some embodiments of the disclosure, the first digitizing scanner 152 scans calibration markings 133 from the paper 110. Alternatively, the first digitizing scanner 152 may identify unique fingerprints 137 for each paper and check with pre-sampled fingerprints in a database at storage 106 to authenticate that the paper was scanned correctly. Further alternatively, specific locations of the paper are analyzed to determine a unique fingerprint 137 for the paper. Optionally, the type of paper is also determined from characteristics of the digitizing results. The scanning process is authenticated based on identification of the type of paper and/or identification of a unique fingerprint 137.

Alternatively or additionally, the paper 110 is transferred to a second station within the device (100, 200) that digitizes (330) the paper 110 again. The results of the digitizing process (330) at the second station are compared (340) with the results of the digitizing process (320) at the first station to authenticate that the content of the paper (e.g. a document) was scanned correctly. If the results of are essentially the same (350) a copy of the content of the paper 110 are stored (360) in storage 106. In some embodiments of the disclosure, the results of the digitizing process (320) at the first station are held in a transitory memory (RAM) until comparing them with the results of the digitizing process (330) at the second station, after which the results of the first digitizing process and/or the results of the second digitizing process are stored in a database in storage 106.

If however the results are not the same (350) then the paper 110 is forwarded (370) to the failed output tray 174 for examination by the user. In some embodiments of the disclosure, device (100, 200) may then halt processing to prevent mixing up the order of the papers 110. Alternatively, device (100, 200) may continue processing consecutive papers 110.

In some embodiments of the disclosure, device (100, 200) may identify the type of paper used and if the paper is standard (disposable) or enhanced (reusable), based on the results of the digitizing process at any one of the digitized scanners (e.g. before erasing or after). Alternatively or additionally, the user may select the type of paper at controller 102. Optionally, if the paper 110 is reusable (380) the paper 110 will undergo an erasing process (400) to prepare the paper for reuse. However if the paper 110 is not reusable, the paper 110 will be sent (390) to shredder output tray 172 to be destroyed. Alternatively, the paper may be erased and based on the results the type of paper can be determined more easily, since standard paper will tend to be burnt or become discolored from the ablation process.

In the erasing process (400) the content (e.g. ink and toner) of the paper 110 is ablated with a high intensity light beam that burns out the ink and/or toner particles and leaves a blank paper that can be reused.

In an exemplary embodiment of the disclosure, after erasing the paper (400) at a third station, the paper is transferred to a fourth station where the paper 110 is once again digitized (410) with a digitizing scanner (145, 146) to evaluate the status of the paper after being erased. Based on the results of the digitization process at the fourth station, device (100, 200) determines where to send the paper 110. Optionally, if the paper 110 is clean (420) and ready for reuse, the paper 110 is sent to the successful output tray 176 for reuse. If however the paper 110 remains with images and markings (not clean), the paper is sent (430) to the failed output tray 174 for failing to pass the erasing process, or sent (440) to shredder 172 to be chopped up for recycling. Alternatively, the device (100, 200) may provide an indication of the results to the user of the device (e.g. on a display) and the user may place the paper accordingly.

In an exemplary embodiment of the disclosure, device 100 and device 200 provide an authenticated digital original document that replaces original hardcopy documents. The authentication is provided by:

1. Using an authenticated digitizing scanner with calibration markings or two digitizing scanners to verify the integrity of the digitized copy, or using a digitizing scanner that is programmed to identify calibration markings 133 on the paper 110 or to identify the type of paper and/or a unique fingerprint 137 of the paper 110;

2. Using a digitizing scanner to verify erasure of the original hardcopy;

3. Recording with the digitized document meta-data identifying the identity of the user that was in charge of the digitizing process (e.g. based on a password or biometric data) and optionally, other meta-data such as the time of processing;

4. In some cases recording and/or verifying a unique ID image embedded in the document (e.g. a watermark, QR code, paper finger print based on fiber orientation); and 5. Recording the authentication process in an immutable block chain ledger and/or stored in an immutable file format.

Optionally, some or all of the above help to establish an authenticated digital original document, which replaces a hardcopy original document.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove but rather will be defined by the claims.

We claim:

1. A device for digitizing papers, comprising:

a controller having a processor and memory;

a digitizing scanner configured to accept a paper, digitize content of the paper and transfer the digitized content to the controller;

a program executed by the controller that is configured to determine that the digitizing scanner is functioning correctly by identifying in the digitized content information that provides such an indication;

wherein said information comprises:

a. a calibration marking from a specific location of the paper that matches a pre-stored calibration marking expected by the digitizing scanner;

b. a unique fingerprint from a specific location of the paper that matches a previously stored unique fingerprint previously taken from the paper; or c. a unique fingerprint that enables identifying a type of the paper that was digitized from characteristics of the unique fingerprint; and wherein said calibration markings are formed by preprocessing the paper to include an embedded image; and said unique fingerprints are based on a microscopic image of a preselected location of paper.

2. The device of claim 1, wherein the controller provides an indication of the determination on a display.

3. The device of claim 1, wherein the device includes two or more output trays and the controller directs the paper to one of the output trays based on the determination.

4. The device of claim 1, wherein the unique fingerprints are stored in a database to uniquely identify the paper when processed in the future by the device.

5. The device of claim 1, wherein the device is configured to track the number of times a specific paper is erased based on the unique fingerprint.

6. The device of claim 1, wherein the controller identifies if the type of paper is standard disposable or enhanced reusable.

7. The device of claim 6, further comprising an ablation scanner configured to erase the content of the paper; and wherein the ablation scanner is activated by the controller based on the determination and based on identifying if the paper is enhanced reusable.

8. The device of claim 7, further comprising another digitizing scanner configured to evaluate the paper after being erased by the ablation scanner; and wherein the controller updates the determination based on the evaluation.

9. The device of claim 1, wherein the calibration markings are non-visible to a naked eye.

10. A method of digitizing, comprising:
accepting papers for digitizing;
digitizing content of the paper with a digitizing scanner:
determining that the digitizing scanner is functioning correctly by identifying in the digitized content information that provides such and indication, with a program executed by a controller;

wherein said information comprises:
a. a calibration marking from a specific location of the paper that matches a pre-stored calibration marking expected by the digitizing scanner;
b. a unique fingerprint from a specific location of the paper that matches a previously stored unique fingerprint previously taken from the paper; or
c. a unique fingerprint that enables identifying a type of the paper that was digitized from characteristics of the unique fingerprint; and wherein said calibration markings are formed by preprocessing the paper to include an embedded image; and said unique fingerprints are based on a microscopic image of a preselected location of the paper.

11. The method of claim 10, wherein the controller provides an indication of the determining on a display.

12. The method of claim 10, wherein the device includes two or more output trays and the controller directs the paper to one of the output trays based on the determining.

13. The method of claim 10, wherein the unique fingerprints are stored in a database to uniquely identify the paper when processed in the future by the method.

14. The method of claim 10, wherein the device tracks the number of times a specific paper is erased based on the unique fingerprint.

15. The method of claim 10, wherein the controller identifies if the type of paper is standard disposable or enhanced reusable.

16. The method of claim 15, further comprising an ablation scanner configured to erase the content of the paper; and wherein the ablation scanner is activated by the controller based on the determining and based on identifying if the paper is enhanced reusable.

17. The method of claim 16, further comprising another digitizing scanner configured to evaluate the paper after being erased by the ablation scanner; and wherein the controller updates the determining based on the evaluation.

* * * * *